United States Patent [19]

Altman et al.

[11] Patent Number: 5,011,516

[45] Date of Patent: Apr. 30, 1991

[54] CATALYTIC OXIDATION OF $SO_2$ TO $SO_3$ IN THE PRESENCE OF FLY ASH

[75] Inventors: Ralph A. Altman, Chattanooga, Tenn.; John P. Gooch; Edward B. Dismukes, both of Birmingham, Ala.

[73] Assignee: Electric Power Research Institute, Inc., Palo Alto, Calif.

[21] Appl. No.: 432,068

[22] Filed: Nov. 6, 1989

[51] Int. Cl.[5] .......................... B03C 1/00; C01B 17/00

[52] U.S. Cl. ........................................... 55/5; 423/242

[58] Field of Search .......... 423/242 A, 242 R, 244 A, 423/244 R; 55/5

[56] References Cited

U.S. PATENT DOCUMENTS

| | | | |
|---|---|---|---|
| 3,581,463 | 6/1971 | Roberts | 55/5 |
| 3,689,213 | 9/1972 | Guerrieri | 55/5 |
| 3,993,429 | 11/1976 | Archer | 55/5 |
| 4,770,674 | 9/1988 | Tellini et al. | 55/5 |

*Primary Examiner*—Gregory A. Heller
*Attorney, Agent, or Firm*—Flehr, Hohbach, Test, Albritton & Herbert

[57] ABSTRACT

A method is provided for improving the electrostatic precipitation of particulates, i.e., from combustion gases by withdrawing part of the flue gases, catalytically converting the $SO_2$ to $SO_3$ and reinjecting it into the main flue stream.

11 Claims, 3 Drawing Sheets

CATALYTIC OXIDATION OF $SO_2$ TO $SO_3$ IN THE PRESENCE OF FLY ASH

The present invention is directed to an improved method for conditioning combustion gas for removal of particulates using electrostatic precipitation. The fly ash is conventionally removed from combustion gases by electrostatic precipitation wherein the surface resistivity of the ash is reduced for efficient precipitation. If a high sulfur-content fuel, such as high sulfur-content coal, is used in the combustor, the concentration of sulfur-containing gases ($SO_X$ and in particular $SO_3$) in the combustion gas will usually be sufficient to reduce the resistivity of the fly ash to a level at which the electrostatic precipitator can efficiently function (usually about $5\times10^{10}$ ohm-cm). However, if the coal used as fuel in the combustor produces combustion gases which contain less than approximately 0.1% of $SO_X$($SO_2+SO_3$) then the flue gas needs to be augmented with sulfur trioxide ($SO_3$).

One of the methods of making sulfur trioxide is to add ammonium sulfate into the flue system at a temperature above approximately 700° F., where the additive is thermally decomposed to form $SO_3$, ammonia and water. However, the formation of ammonia then creates a different environmental problem. Ammonia may be removed by treating the flue gas with a catalyst which converts ammonia to nitrogen gas.

In Pat. No. 3,581,463, a portion of the flue gas is withdrawn, electrostatically cleaned to remove particulates, then passed through a catalyst chamber to convert sulfur dioxide contained in the flue gas to sulfur trioxide. Then the sulfur trioxide is returned to the main flue gas stream which passes through an electrostatic precipitator. A disadvantage of this method is that the portion of the withdrawn flue gases to be catalytically treated must first be cleaned of the particulate matter, to avoid fouling of the catalytic material.

It is thus an object of the present invention to provide a novel method of conditioning combustion gases by which the combustion gases are not first cleaned of particulate matter. Rather, a portion of the combustion gases is diverted into a slip stream where the gases particulate matter together pass through a catalyst with a particular design wherein a major portion of $SO_2$ in the diverted gases is converted to $SO_3$. The catalyst design has two preferred configurations. The first is a collection of parallel hollow tubes separated by spacers. The second is a honeycomb with parallel passages which can be triangular, rectangular, hexagonal, octagonal, etc., or round.

These and other objects will be apparent from the following description of the preferred embodiments and from the accompanying figures and practice of the invention.

SUMMARY OF THE INVENTION

A method is provided to enhance the removal of particulates from a combustion gas by electrostatic precipitation. The improvement comprises the step of withdrawing from a location upstream of the electrostatic precipitator a minor amount of the total volume of the combustion gases entering the flue, including the particulates associated with that minor amount of combustion gases, contacting the minor amount of combustion gases and associated particulates with catalytic means to convert $SO_2$ to $SO_3$; and mixing the remainder of the minor amount of withdrawn combustion gases and the $SO_3$ with the main stream of combustion gases and subjecting the mixture to electrostatic precipitation. The catalytic means is disposed within a passage substantially parallel to the flow of the main stream whereby particulates freely flow through the passage without substantially interfering with the catalytic conversion of $SO_2$ to $SO_3$.

BRIEF DESCRIPTION OF THE DRAWINGS

FIG. 2 is a perspective view of a preferred parallel passage catalyst configuration for use in accordance with the present invention.

FIG. 3 is a perspective view of a second preferred parallel passage catalyst configuration for use in accordance with the present invention.

SUMMARY OF THE PREFERRED EMBODIMENTS

In a typical combustor which burns coal, essentially the entire sulfur content of the coal, which may vary from less than 1% to over 6% of the coal, is oxidized to sulfur dioxide during combustion. Usually 1.0% or less of the sulfur dioxide is further oxidized to sulfur trioxide. The sulfur trioxide combines with the entrained moisture to form sulfuric acid which, in turn, adsorbs or condenses on the fly ash particles as the flue gases cool. The sulfuric acid which adsorbs or condenses on the fly ash particles determines the electrical resistivity of the particles and thus the efficiency of electrostatic precipitation in the precipitator. Most precipitators are designed to receive flue gases at a temperature in the range of about 250°-400° F. However, when the sulfur content of the coal being used is too low, there is insufficient sulfur trioxide in the combustion gases to reduce the electrical resistivity of the particles. Therefore sulfur trioxide may be injected into the flue stream from an external system.

Figure 1:
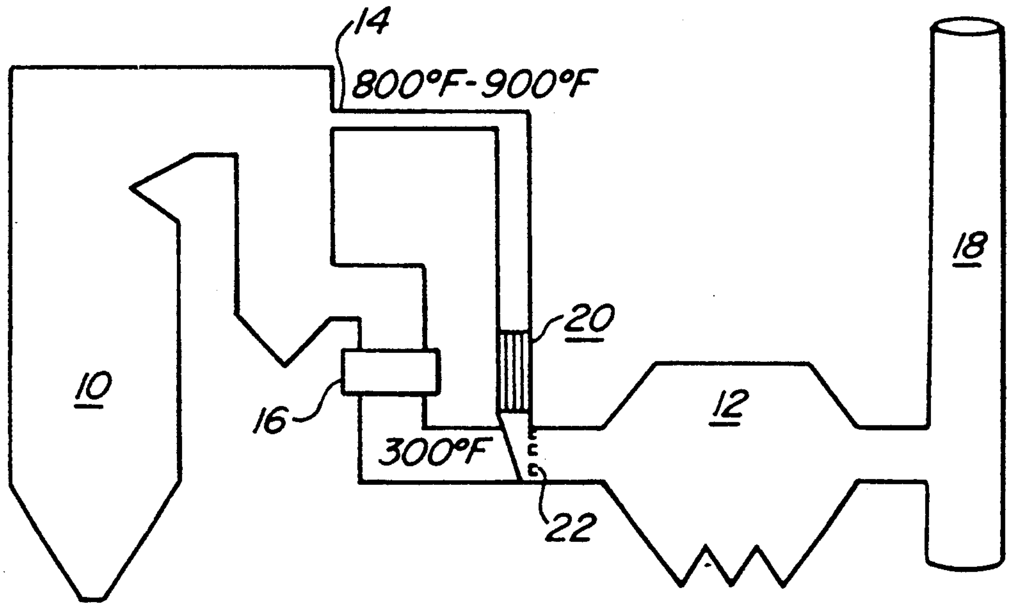
FIG. 1 is a schematic illustration of a combustor flue system, electrostatic precipitator and stack showing the principles in accordance with the present invention.

The present invention is particularly useful for the conditioning of combustion gas produced by the combustion of low-to-medium-sulfur-content coal. Referring to FIG. 1, the fuel is burned within the combustor 10 and the combustion gases are directed into the flue system. At a point in the flue system upstream of the electrostatic precipitator 12 a portion of the flue gases is withdrawn through conduit 14. Preferably about 1-5% of the total volume of gases entering the flue is withdrawn through the conduit 14 at a point at which the flue gases are in temperature range of approximately about 750°-900° F. The major portion of the flue gas continues through the flue system where it is passed through air heater 16 and then into the electrostatic precipitator 12 at the optimum temperature for precipitation of fly ash of about 250°-400° F. The gases then exit the stack 18. The path of the minor amount of withdrawn flue gases directed through conduit 14 is passed through a series of parallel airflow passages 20 which are lined with a catalytic material for converting $SO_2$ to $SO_3$. Such catalysts can contain vanadium pentoxide with an alkali modifier such as $K_2O$, or the lining can contain other conventional catalysts used for the conversion of $SO_2$ to $SO_3$ in the presence of combustion gases and moisture. The parallel flow-through passages 20 are of the hollow-tube or honeycomb type, preferably as described earlier and illustrated in FIGS. 2 and 3, and allow for passage therethrough of gases and particulates without fouling of the catalytic material which lines or is incorporated in the walls of the passages. The withdrawn combustion gases and the $SO_3$ produced by catalytic conversion at passages 20 are then reintroduced into the main flue stream at injectors 22. The $SO_3$ produced at the passages 20, when admixed with the main flue gases, is sufficient to raise the level of $SO_3$ within the flue to thereby enhance the efficiency of electrostatic precipitation of fly ash in the precipitator 12. Normally and conveniently, the mixture of gases just prior to being introduced into the precipitator 12 are at a temperature in the range of about 250°–400° F.

Figure 2A:
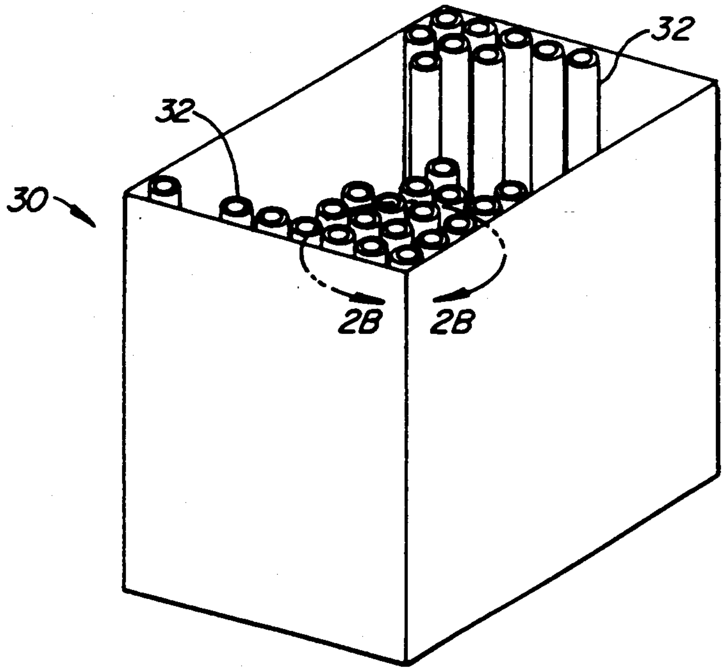
FIG. 2A is a view of a module.
Figure 2B:
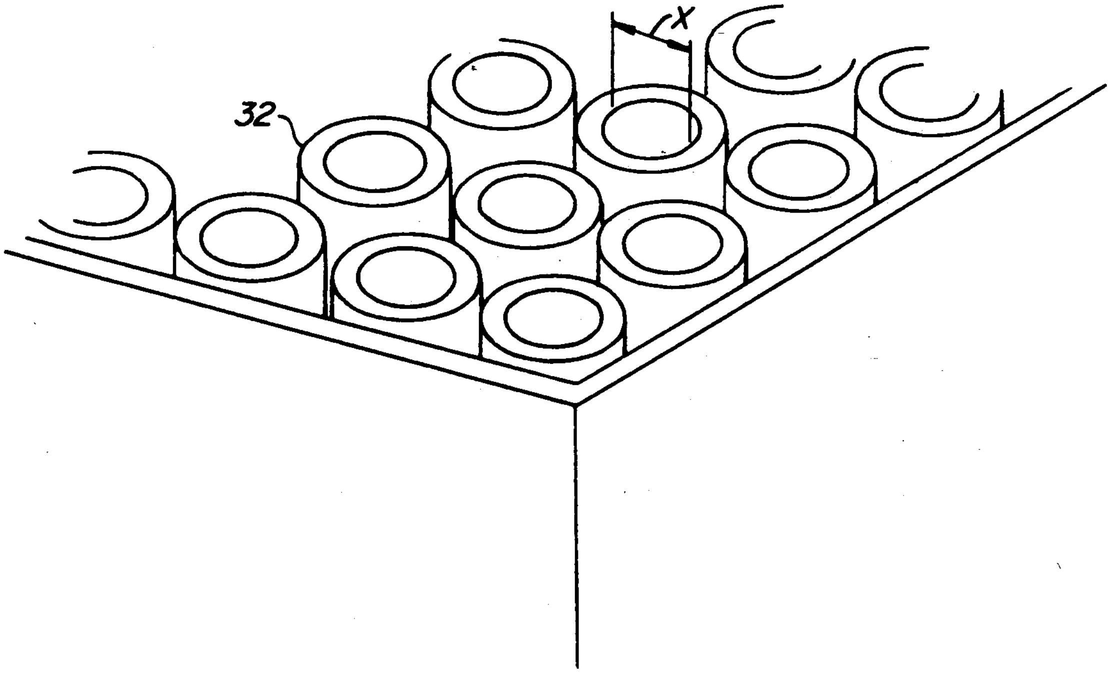
FIG. 2B is a detailed view of tubes which comprise the module.

Referring to FIG. 2, there is shown a perspective view of a preferred configuration of the parallel passage catalysts which may comprise passages 20 in FIG. 1. The catalyst configuration may be in the form of a module 30 into which are stacked a series of hollow parallel tubes 32 having the catalytic material on the inner surfaces thereof. As shown, the module 30 is not completely filled with tubes 32, however, the module 30 will in actual use be tightly packed with tubes 32. Referring to FIG. 2B, there is shown a closeup view of a portion of the module 30. The tubes 32 as shown need not be circular in cross-section but may assume other shapes, such as octagonal, hexagonal, etc. Most particularly preferred are the dimensions of tubes 32 such that the minimum diameter X (or other minimum dimension of opposing surfaces containing catalytic material) should be greater than about 0.25 inches.

Figure 3A:
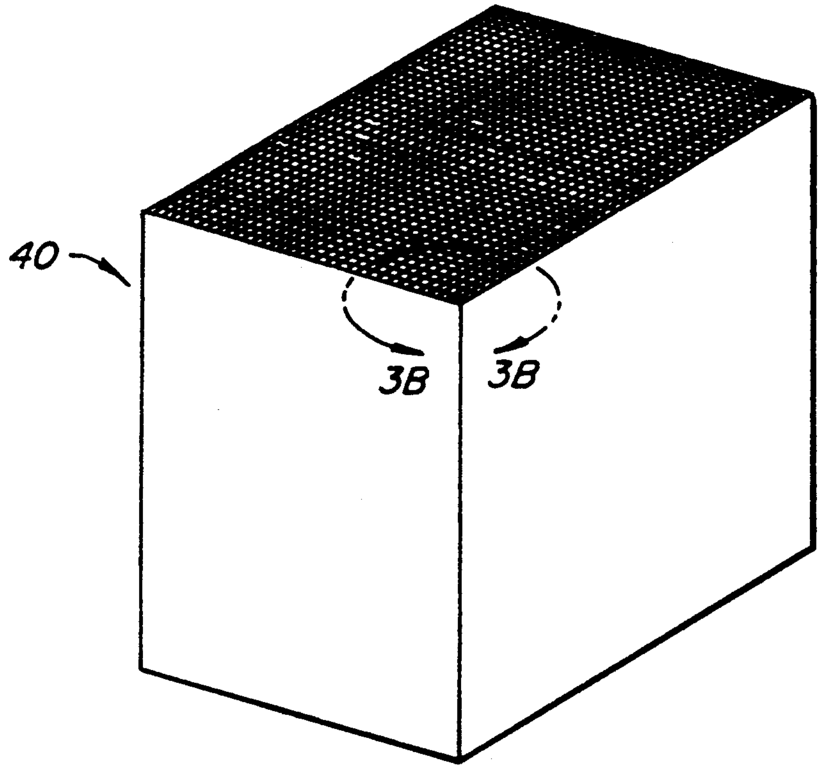
FIG. 3A is a view of a module.
Figure 3B:
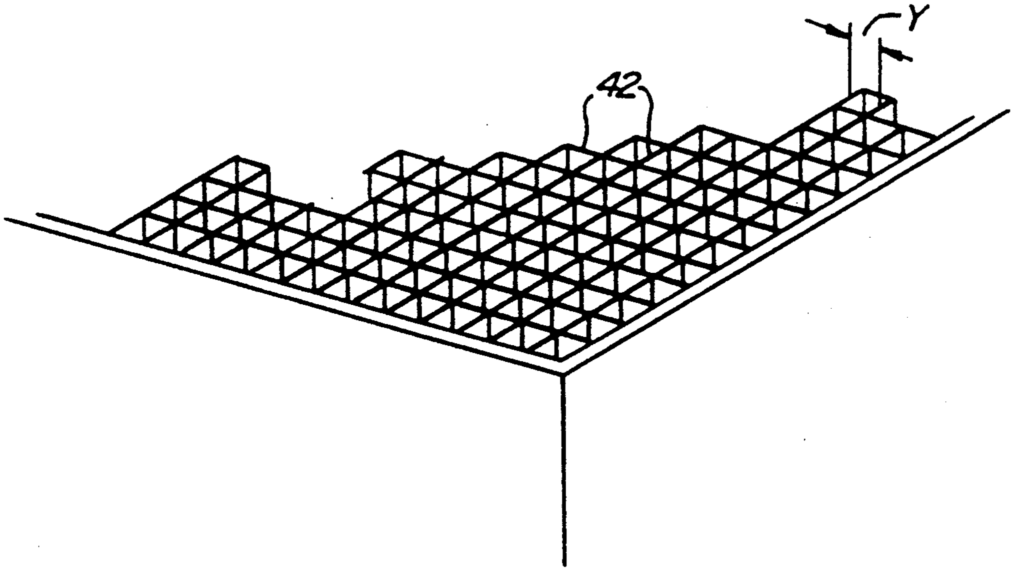
FIG. 3B is a detailed view of the rectangularly-shaped honeycomb which comprises the module.

Referring to FIG. 3 there is shown a second preferred embodiment of the passages 20 of FIG. 1 comprising a module 40 wherein each of the passages is defined by walls 42 in a honeycomb structure whereby the walls form the passages. In a particular preferred embodiment the minimum dimension Y between opposing surfaces containing catalytic material should be at least about 0.25 inches. As shown in FIG. 3B, the catalytic material will line both sides of each of the walls 42.

The present invention is particularly useful for enhancing $SO_3$ content in combustion gases which contain less than 0.1% sulfur oxide and less than 5 ppm sulfur trioxide. Suitable means for injecting of the sulfur trioxide containing gas into the flue gas streams at 22 are known in the art.

It will be understood that various control features may be utilized in connection with the invention which are readily adaptable by those of ordinary skill in the art to the features in the apparatus disclosed herein. For example, conduit 14 may be equipped with a suitable control means programmed to respond to the $SO_2$ and/or $SO_3$ content of the combustion gases to regulate the volume of gases which are withdrawn for treatment with the catalyst. Alternatively, the control means may respond to the flow rate of flue gas in the flue, the level of combustor operation or the efficiency of the electrostatic precipitator as determined by the opacity of the flue gas exiting the precipitator.

The description hereinabove presents the preferred embodiment in accordance with the principle of the present invention; however, it is understood that various modifications may be made by those of ordinary skill in the art without departing from the spirit and scope of the invention.

The present invention is not intended to be limited, except by the scope of the following claims.

What is claimed is:

1. A combustion gas conditioning method whereby particulates are removed from the main stream of combustion gases containing sulfur dioxide in a flue by electrostatic precipitation means, said method comprising the steps of withdrawing from a location upstream of said electrostatic precipitation means a minor amount of the total volume of said combustion gases entering said flue, including the particulates associated with said minor amount of combustion gases; contacting said minor amount of combustion gases and particulates associated therewith with catalytic means to convert $SO_2$ contained therein to $SO_3$; and mixing said minor amount of combustion gases and $SO_3$ into said main stream of combustion gases and subjecting the mixture formed thereby to electrostatic precipitation; wherein said catalytic means is exposed to said combustion gases within an open gas flow passage whereby particulates freely flow therethrough without substantially interfering with the catalytic conversion of $SO_2$ to $SO_3$ by said catalytic means.

2. A method according to claim 1 wherein said minor amount of combustion gases is removed at a temperature in the range of about 750°–900° F. from said flue gases.

3. A method according to claim 1 wherein said combustion gases contain less than 0.1% by volume of $SO_2$.

4. A method according to claim 1 wherein said combustion gases and $SO_3$ are remixed with said main stream of combustion gases at a temperature in the range of 250°–400° F.

5. A method according to claim 1 wherein said catalytic means comprises alkali-modified vanadium pentoxide.

6. A method according to claim 5 wherein the catalytic conversion efficiency of $SO_2$ to $SO_3$ by said catalytic means is greater or equal to 50%.

7. A method according to claim 1 wherein said minor amount of combustion gases comprises from 1–5% by volume of the total combustion gases entering said flue.

8. A method according to claim 1 wherein said gas flow passages are substantially parallel.

9. A method according to claim 8 wherein said passages comprise hollow tubes.

10. A method according to claim 8 wherein said passages are formed by contiguous walls in a honeycomb configuration.

11. A method according to claim 9 or 10 wherein the minimum transverse dimension between opposing surfaces within each of said passages is at least about 0.25 inches.

* * * * *